L. L. B. DENIS.
DYNAMIC SYSTEM ADAPTED TO IMPART TO A MECHANICAL SYSTEM A RAPID MOVEMENT OF OSCILLATION.
APPLICATION FILED JUNE 21, 1920.
1,393,671.
Patented Oct. 11, 1921.
2 SHEETS—SHEET 1.
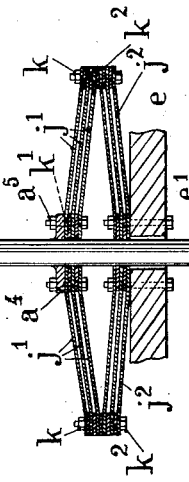
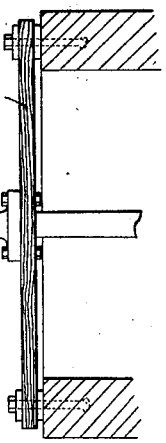
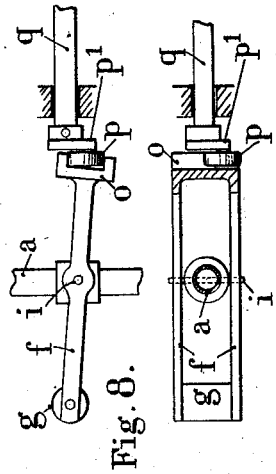
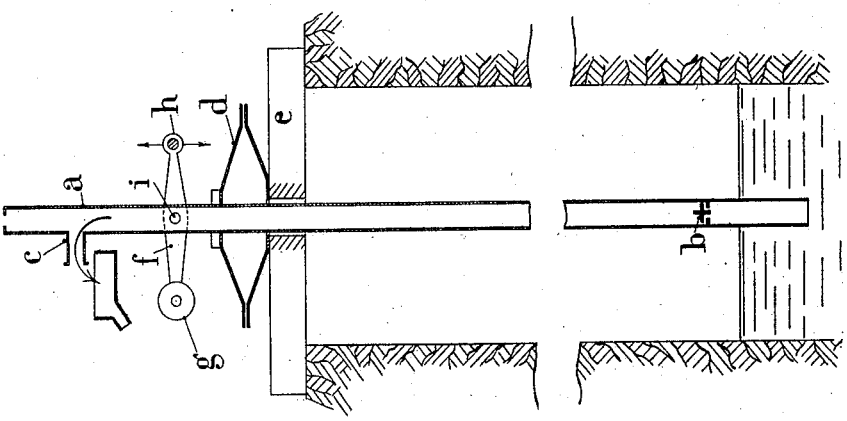
INVENTOR
Luc L. B. Denis
BY
ATTORNEYS L. L. B. DENIS.
DYNAMIC SYSTEM ADAPTED TO IMPART TO A MECHANICAL SYSTEM A RAPID MOVEMENT OF OSCILLATION.
APPLICATION FILED JUNE 21, 1920.
1,393,671.
Patented Oct. 11, 1921.
2 SHEETS—SHEET 2.
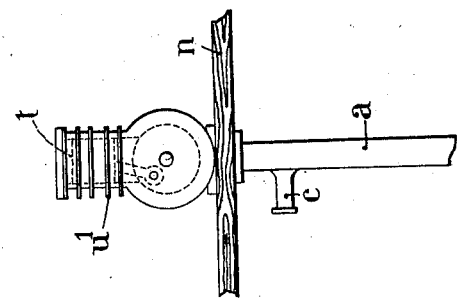
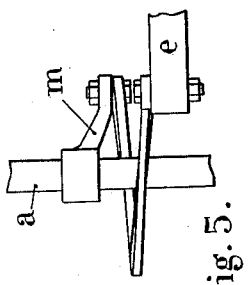
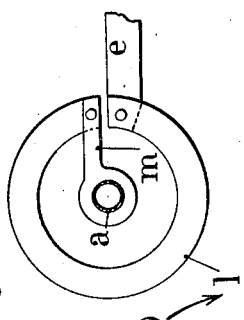
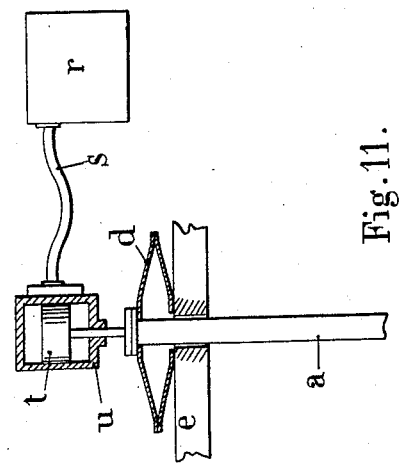
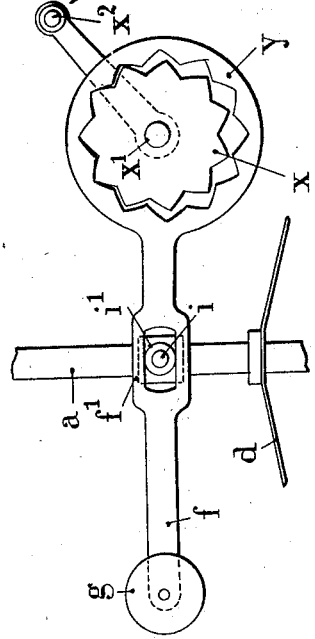
INVENTOR
Luc. L. B. Denis
BY
ATTORNEYS

UNITED STATES PATENT OFFICE.

LUC LÉON BASILE DENIS, OF PARIS, FRANCE.

DYNAMIC SYSTEM ADAPTED TO IMPART TO A MECHANICAL SYSTEM A RAPID MOVEMENT OF OSCILLATION.

1,393,671.  Specification of Letters Patent.  Patented Oct. 11, 1921.

Application filed June 21, 1920. Serial No. 390,575.

*To all whom it may concern:*

Be it known that I, LUC LÉON BASILE DENIS, of 116 Boulevard de Ménilmontant, Paris, France, have invented a Dynamic System Adapted to Impart to a Mechanical System a Rapid Movement of Oscillation, of which the following is a full, clear, and exact description.

This invention relates to a dynamic system permitting to impart to a non-rigid mechanical system a rapid movement of oscillation, with the minimum of loss work by effects of inertia and by avoiding the prejudicious effects of resonance.

This dynamic system is characterized substantially by the combination:

— of an elastic system through the medium of which the system to be actuated is connected to a fixed point, — of a device of "conditional control" of the movement of oscillation, that is to say of control in which the movement is obtained, not by the direct connection between a motor and the displaced system, but by the utilization of the effects of inertia of an additional mass combined with the preceding elements.

In order to fix the ideas, the application of the invention to a pump will first be described, this pump being constituted by a vertical tube provided with a valve, to which a vertical to-and-fro movement is imparted, as described in the United States patent application filed on July 11th, 1919, No. 310228 in the name of the applicant.

Figure 1 is a vertical sectional view of a pump embodying the invention,

Fig. 2 is an enlarged fragmentary vertical sectional view illustrating a type of spring particularly suited for the case of straight trajectories, Fig. 3 is a plan view of the structure shown in Fig. 2, Fig. 4 is a side elevation showing another form of spring, Fig. 5 is a plan view of the structure shown in Fig. 4, Fig. 6 is a sectional elevation showing another form of spring, Fig. 7 is an enlarged detail fragmentary side elevation partly in section and showing a device for actuating the beam, Fig. 8 is a plan view of the structure shown in Fig. 7, Fig. 9 is a sectional elevation showing a modified form of operating means, Fig. 10 is a side elevation showing another form of the operating means, and Fig. 11 is a side elevation showing a still further modified form of operating means.

As illustrated in Fig. 1, this pump is constituted by a vertically arranged pipe $a$ the lower end of which is immersed in the water to be raised. This pipe is provided with a flap valve $b$, arranged at its lower part, and with an outlet branch $c$ at its upper part.

This pipe $a$ is secured on the movable part of a spring or elastic system $d$, the other part of which is connected to a fixed point, which in this case is the cross-bar $e$ arranged above the well and held stationary by fastenings or any other suitable means. The pipe $a$ hangs freely in the well, without any guide or bearings.

In proximity to the attachment of the spring on the pipe, a beam $f$ is hinged on this pipe. One of the ends of this beam carries a counterweight $g$; the other end $h$ receives, in any suitable manner, a reciprocating movement, indicated by the arrows.

The beam $f$ provided with its counterweight and subjected at its end $h$ to a reciprocating movement, constitutes what has been called above the "conditional control" of the system which is to receive the oscillatory movement and the function of this control will be clearly understood from the explanation of the working given hereafter.

If we suppose the pipe $a$ is suddenly moved away from its mean position in a vertical direction, this pipe will take, under the action of the spring, a movement of oscillation, of determined frequency, which depends only upon the total mass of the movable system and upon the resiliency of the spring; this frequency, peculiar to the systems $a$ and $d$, is the working frequency.

Suppose now the end $h$ receives a reciprocating movement, from a motor for instance, At the beginning, the frequency of this reciprocating movement is inferior to the above defined working frequency. The beam $f$ simply oscillates about the axis $i$ of the beam, this point $i$ remaining stationary in the space, as well as the pipe $a$, while the counterweight $g$ takes a reciprocating movement which is the reverse of that of $h$.

When the frequency of the oscillations of the end $h$ of the beam reaches the working frequency of the systems $a$, $d$, by an effect of resonance, the pipe $a$ takes a reciprocating movement; this movement presents a phase-displacement relatively to that of the end $h$; this phase-displacement is so much the more greater as the work absorbed (in the present case the quantity of water raised) is greater.

The stroke, which is null at the beginning, increases progressively until it reaches the stable working of normal operation.

The results obtained may be varied by acting on the three factors: stroke imparted to $h$ by the motor, weight and position of the counterweight and finally resisting stress.

Concerning the counterweight, it may be either beyond the hinge $i$, as shown in Fig. 1, or between this hinge and the hinge $h$, or beyond the hinge $h$.

It is to be noted that as the apparatus of Fig. 1 does not comprise any guide or intermediate supports, it can be very easily placed in position. For putting it in place it suffices to bring it near the well and to lower it therein. For inspection and cleaning, the whole of the apparatus can be raised to the level of the ground and in order to do this it is simply necessary to remove a few bolts.

There will be now described various methods of execution of the spring and of the device of conditional control which are the essential elements of the present invention, capable of being associated together for forming a combination with these two elements.

The spring may be of any type whatever provided it gives satisfaction to the two following conditions:

1°—the trajectory of its free end which is at the same time the point of attachment of the element receiving the reciprocating movement, must be clearly determined.

2°—the resultant of the elastic stresses of this spring must constantly pass through the said point of attachment, not withstanding the distortions of the spring and the displacements of this point. In other words, the spring must not exert bending stresses on the movable element.

According to circumstances, the above defined point of attachment may describe a straight line, or a curve such as an arc of a circle.

Figs. 2 and 3 illustrate a type of spring particularly suited for the case of straight trajectories and is especially convenient for the device of Fig. 1.

This spring is constituted by a number of elastic blades $j^1$, $j^2$ forming two equal groups. The blades $j^1$ of the first group, perforated in their middle part, are secured to a base $a^4$ of the pipe $a$, or other movable element which is to receive the reciprocating movement, by means of bolts $a^5$. The blades $j^2$ of the second group are also perforated at their middle part so as to give free passage to the pipe $a$; they are secured on the cross-bar $e$ by bolts $e^1$.

Figs. 4 and 5 show in elevation and plan view another arrangement of spring, constituted by a flat ring $l$ radially slotted. One of the ends of this open ring is secured by an arm $m$ to the movable member $a$ which is arranged according to the axis of the ring. The other end is secured on the fixed member $e$.

When at rest the spring is flat; Fig. 4 shows it distorted and out of its mean position.

The spring may be made of several superposed similar rings separated by wedges, in a manner similar to the combination of blades of Fig. 2.

A simple and economical arrangement consists in utilizing as a spring, when circumstances permit it, an elastic plank of wood $n$, Fig. 6, secured at its ends to the curb of the well, so as to allow these ends to slightly oscillate about the attachments, which constitute fixed points, but not recesses.

It will be noted that in these various types of spring, by moving the member $a$ away from the mean position by a vertical movement, the spring tends afterward to impart to the same a movement of oscillation parallel to itself.

There will now be described some devices allowing to actuate the end $h$ of the beam.

Two cases are presented according as the motor used has a number of revolutions equal to the working speed, or an inferior number.

In the first case, any known arrangement of link and crank, or of roller and slide-block may be adopted.

Figs. 7 and 8 show, by way of example, a form of execution of the latter combination.

In case the engine is not a rotary engine, but comprises only, as the compressed air hammers, boring machines, etc., a cylinder, a piston and distributing members, the lever $f$ may be actuated by connecting its end $h$ to the piston, the cylinder remaining fixed, attached for instance to the support $e$.

But, in this case, if it is possible to bring the fluid under pressure from the reservoir $r$ to the engine by a flexible pipe $s$, an important simplification may be obtained. In fact, it is possible to do away with the lever $f$ and to connect the piston $t$ directly to the movable member $a$, as shown in Fig. 9. The cylinder $u$, which is rendered heavier if necessary by an additional mass, replaces the counterweight $g$. The principle of this system is the same as in the case of Fig. 1: the "conditional control" is obtained by the fact that this cylinder serves as a non-fixed bearing for causing the mass of the member $a$ and its spring $d$ to oscillate.

Another arrangement consists, when the engine is not too heavy, in mounting it directly on the member $a$, by doing away with the intermediate pulleys, Fig. 10. It presents, moreover, a great analogy with that of Fig. 10 of which it is the reverse; the piston $t$ of the engine $u^1$ forms a conditional reaction mass for driving the member $a$ and the spring $n$.

In the example shown in Fig. 10, the engine is arranged at the upper part of the member $a$. It is also possible, but this arrangement is not so advantageous, to place it on the side of the upper part of the pipe $e$ extending above the spring.

The case in which the number of revolutions of the engine is inferior to the desired frequency will now be examined, as is the case when the system is actuated by hand.

It is then necessary to interpose a multiplying mechanism between the engine and the conditional control.

If the multiplication is of an order rather high, it is advantageous to adopt the device illustrated in Fig. 11, which permits of directly transforming a rotary movement of slow speed into a reciprocating movement of much more high frequency.

This device comprises substantially a pinion $x$, fast on a shaft $x^1$, which is actuated by the operator by means of a crank $x^2$. This pinion is provided with special teeth, each tooth being triangular with round sides and the angle formed by the point of the teeth being an obtuse angle. The number of teeth is equal to the multiplication to be obtained.

The lever $f$ is mounted on the movable member $a$ so as to be capable of sliding and rotating. For that purpose, on the axis $i$ is mounted a roller $i^1$, while the lever $f$ is provided with a slideway $f^1$ engaged on the roller.

The lever carries an internally toothed ring $y$ surrounding pinion $x$. The shape of the teeth corresponding to that of the teeth of the pinion $x$ and this ring has one tooth more than the pinion $x$.

If a rotary movement is imparted to the pinion $x$, the ring is actuated by the teeth in engagement, but as it cannot rotate, it can only roll on the pinion $x$ by taking a planetary motion about this pinion and so as to have effected a complete circle around the pinion for each passage of a tooth of the latter on the vertical. The gearing is insured by the bearing of the ring on the pinion, obtained by the centrifugal force due to the mass of the whole of the ring of the lever $f$ and of the counterweight $g$, as the movement of each point of this ring is approximately a circle having for diameter the difference between the pitch diameters of the pinion and of the ring, that is to say a circle having for circumference the value of one pitch. By the obtuse shape of the teeth a rolling without sliding is obtained, which is nearly similar to that of a hollow cylinder on a solid cylinder a little smaller; the movement takes place without shocks and thus there is obtained for the beam $g$ a form of movement similar to that of a connecting rod, but in which the number of revolutions would be much greater than that of the crank.

This special device may receive various forms of execution, particularly by arranging it differently relatively to the lever $f$. Thus, the plane of gearing may be at right angles to the lever $f$; the axis $x^1$ being then in alinement with the axis of the lever $f$.

The above arrangements are given by way of example only; the forms, dimensions and detail arrangements may be varied according to circumstances without departing thereby from the nature of the invention.

Claims:

1. In a dynamic system adapted to impart to a non-rigid mechanical system a rapid movement of oscillation, a movable part which must take a movement of oscillation, a fixed point, an elastic system connecting the movable part to the fixed point, a non-rotating mass free in space, means giving support to this mass to give action to the movable part.

2. In a dynamic system adapted to impart to a non-rigid mechanical system a rapid movement of oscillation, a movable part which must take a movement of oscillation, a fixed point, an elastic system connecting the movable part to the fixed point, a non-rotating mass free in space, and a lever supporting this mass, said lever being joined to the movable part, and receiving at one extremity an alternative movement.

3. In a dynamic system adapted to impart to a non-rigid mechanical system a rapid movement of oscillation, a movable part which must take a movement of oscillation, a fixed point, a spring connecting the movable part to the fixed point, a non-rotating mass free in space, and means supporting this mass whereby motion is communicated to the movable part.

4. In a dynamic system adapted to impart to a non-rigid mechanical system a rapid movement of oscillation, a movable part which must take a movement of oscillation, a fixed point, a spring formed by a split ring of which one extremity is connected to a fixed point and the other to the part to be brought in action, a non-rotating mass free in space, and means supporting this mass whereby motion is communicated to the movable part.

The foregoing specification of my "dynamic system adapted to impart to a mechanical system a rapid movement of oscillation" signed by me this 28th day of May, 1920.

LUC LÉON BASILE DENIS.